US009186956B2

(12) United States Patent
Kominami

(10) Patent No.: US 9,186,956 B2
(45) Date of Patent: Nov. 17, 2015

(54) HEAT MEDIUM HEATING UNIT AND VEHICLE AIR CONDITIONING APPARATUS PROVIDED WITH THE SAME

(75) Inventor: Satoshi Kominami, Tokyo (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 328 days.

(21) Appl. No.: 13/989,984

(22) PCT Filed: Mar. 28, 2012

(86) PCT No.: PCT/JP2012/058068
§ 371 (c)(1),
(2), (4) Date: May 28, 2013

(87) PCT Pub. No.: WO2012/137639
PCT Pub. Date: Oct. 11, 2012

(65) Prior Publication Data
US 2013/0243411 A1 Sep. 19, 2013

(30) Foreign Application Priority Data

Apr. 7, 2011 (JP) ................................ 2011-085569

(51) Int. Cl.
F24H 1/10 (2006.01)
B60H 1/22 (2006.01)
(Continued)

(52) U.S. Cl.
CPC ............ *B60H 1/2225* (2013.01); *B60H 1/2221* (2013.01); *F24H 1/121* (2013.01); *F24H 3/062* (2013.01); *H05B 3/22* (2013.01); *H05B 2203/02* (2013.01); *H05B 2203/023* (2013.01)

(58) Field of Classification Search
CPC ........... B60H 2001/00128; B60H 2001/00135; B60H 2001/2265; B60H 2001/2287; F24H 3/0429; F24H 3/085; F24H 9/1872; F24H 1/009; F24H 3/0435; F24H 3/0441; F24H 3/0405; F24H 3/047; F24H 3/0476; F24H 1/01

See application file for complete search history.

(56) References Cited

U.S. PATENT DOCUMENTS 5,057,672 A * 10/1991 Bohlender et al. ............ 219/540
5,377,298 A * 12/1994 Yang .............................. 392/360

(Continued)

FOREIGN PATENT DOCUMENTS

CN 101097092 A 1/2008
EP 1 580 495 A1 9/2005

(Continued)

OTHER PUBLICATIONS

International Search Report of PCT/JP2012/058068, mailing date of Jun. 26, 2012, w/ Partial English machine translation.

(Continued)

*Primary Examiner* — Thor Campbell
(74) *Attorney, Agent, or Firm* — Westerman, Hattori, Daniels & Adrian, LLP

(57) ABSTRACT

Provided is a heat medium heating unit comprising a plurality of flat heat exchange tubes, PTC heaters incorporated between flat tube portions, a heat exchanger pressing member that presses from one side the flat tubes and the PTC heaters against the inner surface of a casing, and a control board that is disposed above the heat exchanger pressing member and that controls the PTC heaters. A terminal extending upwards from an electrode plate directly connects to a terminal supports of the control board. On an inner surface of the casing, since a positioning means that engages with the terminal to position the terminal and the plate, the thermal contact resistance between the flat heat exchanger tubes and the PTC heaters is reduced.

10 Claims, 5 Drawing Sheets

(51) Int. Cl.
*H05B 3/22* (2006.01)
*F24H 3/06* (2006.01)
*F24H 1/12* (2006.01)

(56) References Cited

U.S. PATENT DOCUMENTS

| | | | | |
|---|---|---|---|---|
| 6,055,360 | A * | 4/2000 | Inoue et al. | 392/485 |
| 6,124,570 | A * | 9/2000 | Ebner et al. | 219/202 |
| 6,178,292 | B1 * | 1/2001 | Fukuoka et al. | 392/485 |
| 6,265,692 | B1 * | 7/2001 | Umebayahi et al. | 219/202 |
| 2011/0120146 | A1 * | 5/2011 | Ota et al. | 62/3.3 |
| 2011/0180617 | A1 * | 7/2011 | Saito et al. | 236/49.3 |
| 2012/0237192 | A1 * | 9/2012 | Kominami et al. | 392/480 |
| 2013/0188937 | A1 * | 7/2013 | Kominami et al. | 392/360 |
| 2013/0192796 | A1 * | 8/2013 | Kominami et al. | 165/104.19 |
| 2013/0220987 | A1 * | 8/2013 | Himeno et al. | 219/202 |
| 2013/0230302 | A1 * | 9/2013 | Kominami et al. | 392/307 |
| 2014/0050465 | A1 * | 2/2014 | Kominami et al. | 392/482 |
| 2015/0075204 | A1 * | 3/2015 | Brodie et al. | 62/324.6 |

FOREIGN PATENT DOCUMENTS

| | | |
|---|---|---|
| GB | 850744 A | 10/1960 |
| GB | 2 400 900 A | 10/2004 |
| JP | 52-081632 U | 6/1977 |
| JP | 56-169387 U | 12/1981 |
| JP | 05-231662 A | 9/1993 |
| JP | 2002-283835 A | 10/2002 |
| JP | 2008-007106 A | 1/2008 |
| JP | 2008-056044 A | 3/2008 |
| JP | 4100328 B2 | 3/2008 |
| JP | 2009-094257 A | 4/2009 |
| JP | 2010-002094 A | 1/2010 |
| JP | 2010-284045 A | 12/2010 |
| JP | 2011-016489 A | 1/2011 |
| JP | 2012-056351 A | 3/2012 |

OTHER PUBLICATIONS

Written Opinion of PCT/JP2012/058068, mailing date of Jun. 26, 2012, w/ Partial English machine translation.
Office Action dated Apr. 1, 2015, issued in corresponding Chinese Patent Application No. 201280004013.5, with English translation (19 pages).
Extended European Search Report dated Jul. 6, 2015, issued in counterpart application No. 12767349.9 (4 pages).

* cited by examiner

HEAT MEDIUM HEATING UNIT AND VEHICLE AIR CONDITIONING APPARATUS PROVIDED WITH THE SAME

TECHNICAL FIELD

The present invention relates to a heat medium heating unit that heats a heat medium by using a PTC heater, and a vehicle air conditioning apparatus including the same.

BACKGROUND ART

As one of heat medium heating units provided in vehicle air conditioning apparatus applied to electric vehicles or hybrid cars or the like for heating a heat-transfer medium to serve as a heat source for heating operation, a Positive Temperature Coefficient (hereafter PTC element) heater is known that uses a PTC thermistor element as a heating element. The PTC heaters has a positive thermistor characteristic, in which the value of resistance thereof rises as the temperature rises, which controls the current consumption to make its temperature increase become mild, and in which, thereafter, the current consumption and the temperature of the heating portion reach a saturation level and stay unchanged. Thus, the PTC heater has a self-temperature control feature.

As a heat medium heating unit described above, PTL 1 discloses a heat medium heating unit having multiple partitions that separate the inside of the housing to make a heating chamber and a heat medium circulation chamber within the housing which has an inlet and an outlet for the heat medium, and the PTC heating element is inserted for installation in contact with the partition in the heating chamber defined by the partitions, and the heat medium circulated in the circulation chamber is heated over the partition by the PTC heating element.

Further, PTL 2 discloses a heat medium heating unit of a stacked structure in which an electrode plate, an insulating layer and a heat transfer layer are provided on both surfaces of a PTC element to constitute a plate-like PTC heater, and a pair of heat medium circulation boxes including an inlet and an outlet for a heat medium, and communicating with each other are stacked on both surfaces of the PTC heater, and a substrate housing box that houses a control board and a lid are provided on the external surface thereof.

CITATION LIST

Patent Literature

{PTL 1}
  Japanese Unexamined Patent Application, Publication No. 2008-7106
{PTL 2}
  Japanese Unexamined Patent Application, Publication No. 2008-56044

SUMMARY OF INVENTION

Technical Problem

The device shown in above-stated PTL 1 is configured such that a plurality of PTC heating elements are installed in a plurality of hollow portions arranged in the width and front-back directions of the heating chamber formed by the partitions. Therefore, it is not always easy to insert the PTC heating element for installation between and in close contact with the partitions which serve as the heat transfer surface. By this situation, the thermal contact resistance between the partition and the PTC heating element tends to be large and thereby the heat transfer efficiency tends to be lowered. On the other hand, if intervals between partitions are narrowed to improve the adhesive properties, the workability on assemblage remarkably declines, resulting in an increased workload or the like, problematically. Further, a plurality of PTC heating elements must be individually assembled to a plurality of hollow portions arranged in the width direction and in the front-back direction, and increased complexity of construction, worsened workability in the assembling process, and increased costs are inevitable.

The device disclosed in PTL 2 has a configuration in which a pair of heat medium circulation boxes having radiator fins are stacked on both faces of the PTC heater, and a substrate housing box and its lid that houses the control board is stacked on the external surface thereof and fixed by a bolt. Therefore, it is possible to bring a PTC heater and a heat medium circulation box into close contact with one another, and reduce the thermal contact resistance therebetween. However, since it is difficult to dispose PTC heaters in a multiple layer manner, a large planar space is required, and a heat medium circulation box and a dedicated substrate housing box thereof become necessary. These elements are formed by aluminum die casting in consideration of high-temperature resistance, heat transmission properties or other factors. Therefore, there is a limitation in reduction in the size and the weight, and the cost will become high.

The present invention is made in view of the aforementioned circumstances, and an object of the present invention is to provide a heat medium heating unit that uses a plurality of flat heat exchange tubes and PTC heaters, the plurality of flat heat exchange tubes and PTC heaters being stacked in a multi-layer manner to reduce the thermal contact resistance therebetween, improves the heat transmission characteristic, while achieving an improved performance with a smaller size, an easy and simple electric connection between the PTC heater and the control board, an improved insulation property between electrodes, and an improved workability in the assembling process. It is also an object of the present invention to provide a vehicle air conditioning apparatus including the same.

Solution to Problem

In order to overcome the aforementioned problems, a heat medium heating unit and a vehicle air conditioning apparatus including the same of the present invention employ the following solutions.

In other words, a heat medium heating unit according to a first aspect of the present invention includes: a plurality of flat heat exchange tubes each having a flat tube portion which takes a heat medium through an inlet header portion and which discharges the heat medium after having flowed through the flat tube portion through an outlet header portion; a PTC heater interposed between the flat tube portions of the plurality of flat heat exchange tubes which are stacked on one another; a heat exchanger pressing member for pressing the plurality of flat heat exchange tubes and the PTC heater from one side of the flat heat exchange tube toward an inner surface of a casing so that the plurality of flat heat exchange tubes and the PTC heater come into close contact with one another; and a control board installed on the heat exchanger pressing member, for controlling the PTC heaters, wherein a terminal extended from each of a pair of electrode plates of the PTC heater is directly connected to one or more terminal supports provided in the control board so that the PTC heater and the control board are electrically connected, and a positioning section which engages with the terminal to position the terminals and the electrode plates is provided on the inner surface of the casing.

According to the first aspect, the apparatus is configured such that a plurality of flat heat exchange tubes are stacked, and each flat heat exchange tube and the PTC heaters are pressed into close contact with one another by the heat exchanger pressing member in a state where the PTC heaters are assembled between the flat tube portions of the flat heat exchange tubes. A control board that controls the PTC heaters are installed on the heat exchanger pressing member, and the terminals extended upwardly from the pair of electrode plates of the PTC heaters are directly connected to the terminal support of the control board, so that the PTC heaters and the control board are electrically connected, and a positioning section is provided on the inner surface of the casing, to engage with each of the terminals and position the terminals and electrode plates. Therefore, by stacking the PTC heaters between a plurality of flat heat exchange tubes to have a stacked disposition and pressing it with a heat exchanger pressing member, it is possible to assemble each member in close contact with one another. Upon connecting the terminals extended upwardly from the electrode plates of the PTC heaters to a terminal support of the control board, the terminals and the positioning section provided on the inner surface of the casing are engaged with one another, and the terminals and the electrode plates are positioned. This allows the terminals of the electrode plates and the terminal support of the control board to be connected in an aligned manner. Accordingly it is possible to reduce the thermal contact resistance between the flat heat exchange tubes and the PTC heaters to improve the heat transfer efficiency to achieve a heat medium heating unit of a reduced size with an improved performance, while achieving easy and simple electric connection between the PTC heaters and the control board, ensuring the insulation distance between electrodes and improving workability in assemblage.

Further, the heat medium heating unit according to the first aspect may be configured such that the positioning section is a positioning pin integrally formed with the inner surface of the casing, and the terminals and the electrode plates are configured so that they can be positioned by fitting the positioning pin with a positioning hole provided on the terminal.

According to the aforementioned configuration, the positioning section is configured as a positioning pin integrally formed with the inner surface of the casing, and the terminal and the electrode plates can be positioned by fitting the positioning pin with the positioning hole provided on the terminal. Therefore, by fitting the positioning hole provided on the terminal with the positioning pin integrally formed with the inner surface of the casing, the terminal and the electrode plates can be positioned with respect to the terminal support of the control board. Therefore, it is possible to achieve easy and simple electric connection between the PTC heaters and the control board, and ensure insulation distance between electrodes to improve workability in assemblage.

Further, in the heat medium heating unit according to the first aspect, each of the terminals are provided at one side of each of the electrode plates so that the terminals are spaced from each other along the one side, and the terminals are shaped in a L-shape one end of which extends upward, and the terminals are configured so as to be directly connected to the terminal supports arranged at intervals on one side of the control board.

According to the first aspect, the terminals are extended upwardly on one side of the plurality of electrode plates to have an L-shape and arranged at intervals in a direction along one side of the electrode plates, and the terminals are directly connected to a plurality of terminal supports arranged at intervals on one side of the control board. Therefore, the upper extended portion of each terminal is opposed to a plurality of terminal supports arranged at intervals on one side of the control board by positioning each terminal having an L-shape provided on the one side of the plurality of electrode plates of the PTC heaters assembled between the flat tube portions of the flat heat exchange tubes at respective predetermined positions via the positioning section, and directly connected by screwing or the like to the plurality of terminal supports. Therefore, it becomes possible to achieve easy and simple electric connection between the PTC heaters and the control board, and improve workability in assembling and cost reduction.

Further, the heat medium heating unit including the positioning hole may be configured such that the positioning hole is provided on a horizontally extended portion of each terminal having an L-shape and is configured to be able to fit from above with the positioning pin which is provided on the inner surface of the casing and which is erected in a vertical direction.

According to the aforementioned configuration, each positioning hole is provided in the horizontally extended portion of the terminal having an L-shape, and can be fitted from the above with the positioning pin vertically erected on the inner surface of the casing. Therefore, it is possible to easily position the terminal having an L-shape with respect to the terminal support of the control board by fitting the positioning hole provided on the horizontally extended portion of the terminal with the vertically erected positioning pin. Accordingly, it is possible to achieve easy and simple electric connection between the PTC heaters and the control board, and improve the workability in assembling.

In the heat medium heating unit according to the first aspect, an insulation wall erected upwardly is provided on the inner surface of the casing and at an external surface side of the terminal so as to adjoin the positioning section, a wiring space is formed at an opposite side of the terminal with respect to the insulation wall, and the wiring space is for a power supply harness and an LV harness connected to the control board.

According to the aforementioned aspect, at the external surface side of the terminal which is adjoining to the positioning section and in the interior of the casing an insulation wall erected upwardly is provided, and the opposite side of the terminal with respect to the insulation wall is a wiring space in which the power supply harness and the LV harness connected to the control board are positioned. Therefore, it is possible to reliably ensure a predetermined insulation distance between the terminals of the electrode plates provided on one side of the insulation wall, and the power supply harness and the LV harness provided on the opposite side with respect to the insulation wall. Accordingly, it is possible to enhance the insulation properties of the electrical wiring including the control board and the PTC heaters, and increase the reliability thereof.

Further, heat medium heating unit according to a second aspect of the present invention includes a plurality of flat heat exchange tubes each having a flat tube portion which takes a heat medium through an inlet header portion and which discharges the heat medium after having flowed through the flat tube portion through an outlet header portion; a PTC heater interposed between the flat tube portions of the plurality of flat heat exchange tubes which are stacked on one another; a heat exchanger pressing member for pressing the plurality of flat heat exchange tubes and the PTC heater from one side of the flat heat exchange tube toward an inner surface of a casing so that the plurality of flat heat exchange tubes and the PTC heater come into close contact with one another; and a control board installed on the heat exchanger pressing member, for controlling the PTC heaters, wherein a terminal extended from each of a pair of electrode plates which are provided on vertically opposite surfaces of the PTC heater is directly connected to one or more terminal supports provided in the control board so that the PTC heater and the control board are electrically connected, wherein an insulation wall erected upwardly is provided on the inner surface of the casing and at an external surface side of the terminal which is extended upwardly from the electrode plates, a wiring space is formed at an opposite side of the terminal with respect to the insulation wall, and the wiring space is for a power supply harness and an LV harness connected to the control board.

According to the second aspect, a plurality of flat heat exchange tubes are stacked, and in the state where the PTC heaters are assembled between the flat tube portions of the flat heat exchange tubes, and the PTC heaters and the flat heat exchange tubes are pressed by the heat exchanger pressing member to be brought into close contact with one another. Since the control board that controls the PTC heaters is installed on the heat exchanger pressing member, and the terminals extended upwardly from the pair of electrode plates on and under the PTC heaters are directly connected to the terminal support of the control board, the PTC heaters and the control board are electrically connected with each other. An insulation wall erected upwardly from the inner surface of a casing is provided in the position on the external surface side of the terminal extended upwardly from the electrode plates, and the side opposite to the terminal of the insulation wall is a wiring space of the power supply harness and LV harness connected to the control board. Therefore, by sandwiching the PTC heaters between a plurality of flat heat exchange tubes to achieve a stacked disposition, and pressing it with the heat exchanger pressing member, it becomes possible to assemble them in close contact with one another. Further, it is possible to electrically connect between the PTC heaters and the control board easily by connecting the terminals extended upwardly from the electrode plates to the terminal support of the control board, and it is possible to ensure predetermined insulation distance therebetween by the insulation wall erected between the terminals and the wiring space of the power supply harness and the LV harness connected to the control board. Therefore, it is possible to reduce thermal contact resistance between the flat heat exchange tube and the PTC heaters to improve the heat transfer efficiency, achieve reduction in size of the heat medium heating unit with improved performance, enhance the insulation properties of the electrical wiring including the control board and the PTC heaters and increase the reliability thereof.

Further, in heat medium heating unit according to the second aspect, the insulation wall is integrally formed with the inner surface of the casing, and the wiring space is formed between the insulation wall and an external peripheral wall of the casing.

According to the second aspect, the insulation wall is integrally formed with the inner surface of the casing, and the wiring space is formed between the insulation wall and the external wall of the casing. Therefore, by integrally forming the insulation wall to be erected along the terminal at the external surface side of the terminal extended upwardly from the electrode plates, it is possible to ensure a wiring space isolated from the surrounding elements provided on the external surface side of the insulation wall and the power supply harness and the LV harness connected to the control board can be wired. Accordingly, it is possible to enhance the insulation properties of the control board and the PTC heaters with a simple configuration in which the insulation wall is integrally formed with the casing, and increase the reliability thereof.

Further, a vehicle air conditioning apparatus according to a third aspect of the present invention is a vehicle air conditioning apparatus configured to make a heat medium heated by a heat medium heating unit circulate in a radiator disposed in an air stream path, wherein the heat medium heating unit according to any one of Claims 1 to 8 is employed as said heat medium heating unit to heat said heat medium.

According to the third aspect, a configuration is provided to make heat medium heated by a heat medium heating unit circulate in a radiator disposed in an air stream path. Therefore, it is possible to heat and supply the heat medium delivered to the radiator disposed in the middle of the air stream path, with the above-stated heat medium heating unit whose configuration is simple and which has a reduced size with an improved performance. Accordingly, it is possible to improve the air-conditioning performance of the vehicle air conditioning apparatus, in particular, the heating performance, while it is possible to improve the mountability of the air conditioning apparatus on a vehicle.

Advantageous Effects of Invention

According to the heat medium heating unit of the present invention, by sandwiching the PTC heaters between a plurality of flat heat exchange tubes to have a stacked disposition and pressing them with the heat exchanger pressing member, it is possible to assemble the tubes and heaters in close contact with one another, and engage the terminals and the positioning section provided on the inner surface of the casing, to position the terminals and the electrode plates when connecting the terminals extended upwardly from the electrode plates of the PTC heaters to the terminal support of the control board. With this configuration, since the terminals of the electrode plates and the terminal support of the control board can be connected in an aligned manner, it is possible to reduce thermal contact resistance between the flat heat exchange tube and the PTC heaters to improve the heat transfer efficiency, achieve reduction in size of the heat medium heating unit with an improved performance, achieve easy and simple electric connection between the PTC heaters and the control board, ensure an insulation distance between the electrodes and improve workability in assemblage.

According to the heat medium heating unit of the present invention, by sandwiching the PTC heaters between a plurality of flat heat exchange tubes to achieve a stacked disposition and pressing it with the heat exchanger pressing member, it is possible to assemble the tubes and heaters in close contact with one another, connecting the terminals extended upwardly from the electrode plates of the PTC heaters to the terminal support of the control board. With this configuration, it is possible to electrically connect the PTC heaters and the control board easily, and ensure an predetermined insulation distance for the terminals with respect to the wiring space of the power supply harness and the LV harness connected to the control board by means of the insulation wall erected between the terminals and the wiring space of the power supply harness and the LV harness. Therefore, it is possible to reduce thermal contact resistance between the flat heat exchange tube and the PTC heaters to improve the heat transfer efficiency, achieve reduction in size of the heat medium heating unit with an improved performance, improve the insulation properties of the electrical wiring including the control board and the PTC heaters, and increase the reliability thereof.

Further, according to the vehicle air conditioning apparatus of the present invention, it is possible to heat and supply the heat medium delivered to the radiator disposed in an air stream path, with the above-stated heat medium heating unit having a simple configuration and reduced size which is capable of achieving an improved performance. Therefore, it is possible to improve the air-conditioning performance of a vehicle air conditioning apparatus, in particular, the heating performance thereof, and improve the mountability of the air conditioning apparatus on the vehicle.

DESCRIPTION OF EMBODIMENTS

Hereafter, an embodiment of the present invention will be described with reference to FIG. 1 through FIG. 5.

Figure 1:
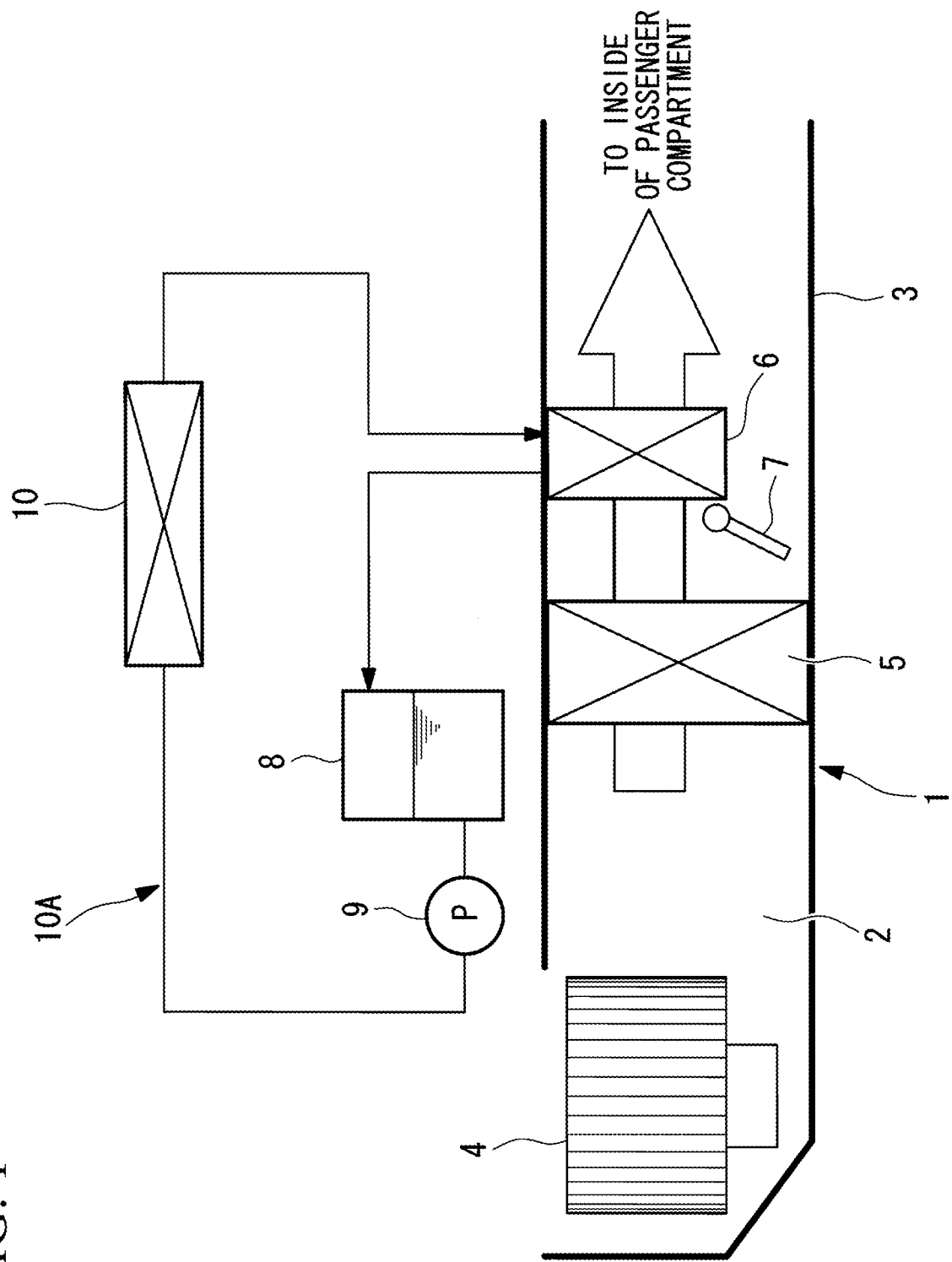
FIG. 1 is a schematic diagram of a vehicle air conditioning apparatus including a heat medium heating unit according to an embodiment of the present invention.

FIG. 1 shows a schematic diagram of a vehicle air conditioning apparatus including a heat medium heating unit according to said embodiment of the present invention.

The vehicle air conditioning apparatus 1 includes a casing 3 that forms an air stream passage 2 which takes outside air or air in a passenger compartment to heat it up and guides the outside air or the air from the passenger compartment to the inside of the passenger compartment.

The casing 3 has a blower 4 that sucks outside air or air in the passenger compartment to rise the pressure thereof, and pumps them to the downstream side, a cooler 5 that cools the air pumped by the blower 4, a radiator 6 that heats the air cooled by going through the cooler 5, an air mix dumper 7 that adjusts flow rate balance between the volume of air passing the radiator 6 and the volume of air bypassing the radiator 6, by causing air-mix between them in the downstream side thereof to adjust the temperature of the conditioned air. They are arranged sequentially in the aforementioned order from the upstream side to the downstream side in the air stream passage 2.

The downstream side of the casing 3 is connected to a plurality of blow-out ports which blow, to the inside of the passenger compartment, air whose temperature is conditioned via a blow-out mode switching dumper and a duct that are not shown.

The cooler 5 constitutes a refrigerant circuit together with a compressor, a condenser and an expansion valve, which are not illustrated, and the cooler 5 vaporizes the refrigerant adiabatically expanded at the expansion valve, and cools the air passing therethrough. The radiator 6 constitutes a heat medium circulation circuit 10A together with a tank 8, a pump 9 and a heat medium heating unit 10, in which a heat medium with a high temperature heated by the heat medium heating unit 10 heats air passing therethrough (for example, antifreeze, water. etc.) by being circulated via the pump 9.

Figure 2:
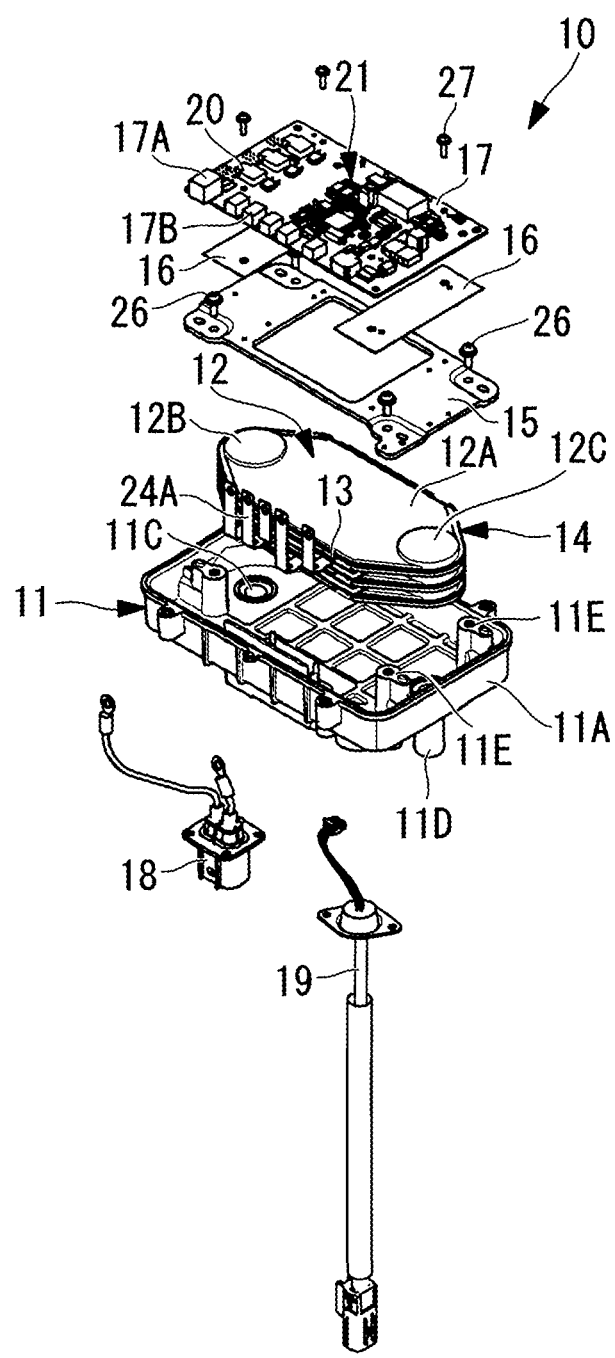
FIG. 2 is an exploded perspective view of the heat medium heating unit shown in FIG. 1.
Figure 3:
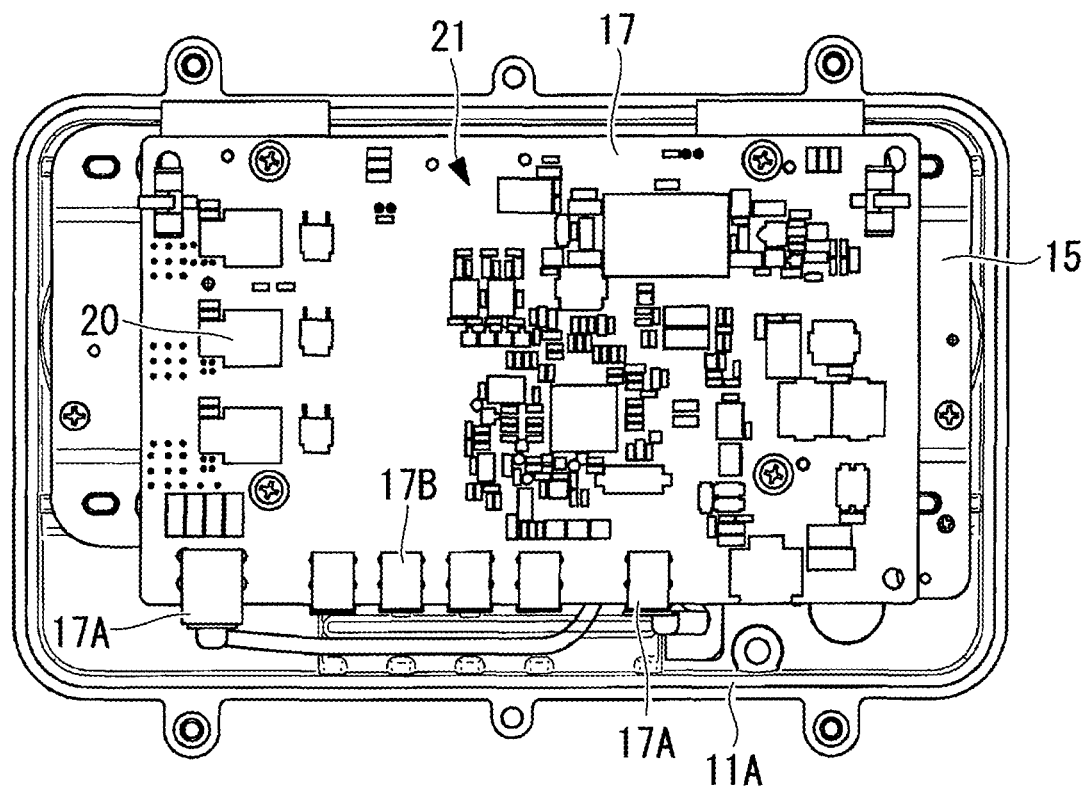
FIG. 3 is a plan view showing a state of the heat medium heating unit of FIG. 2 with its upper case removed.
Figure 4:
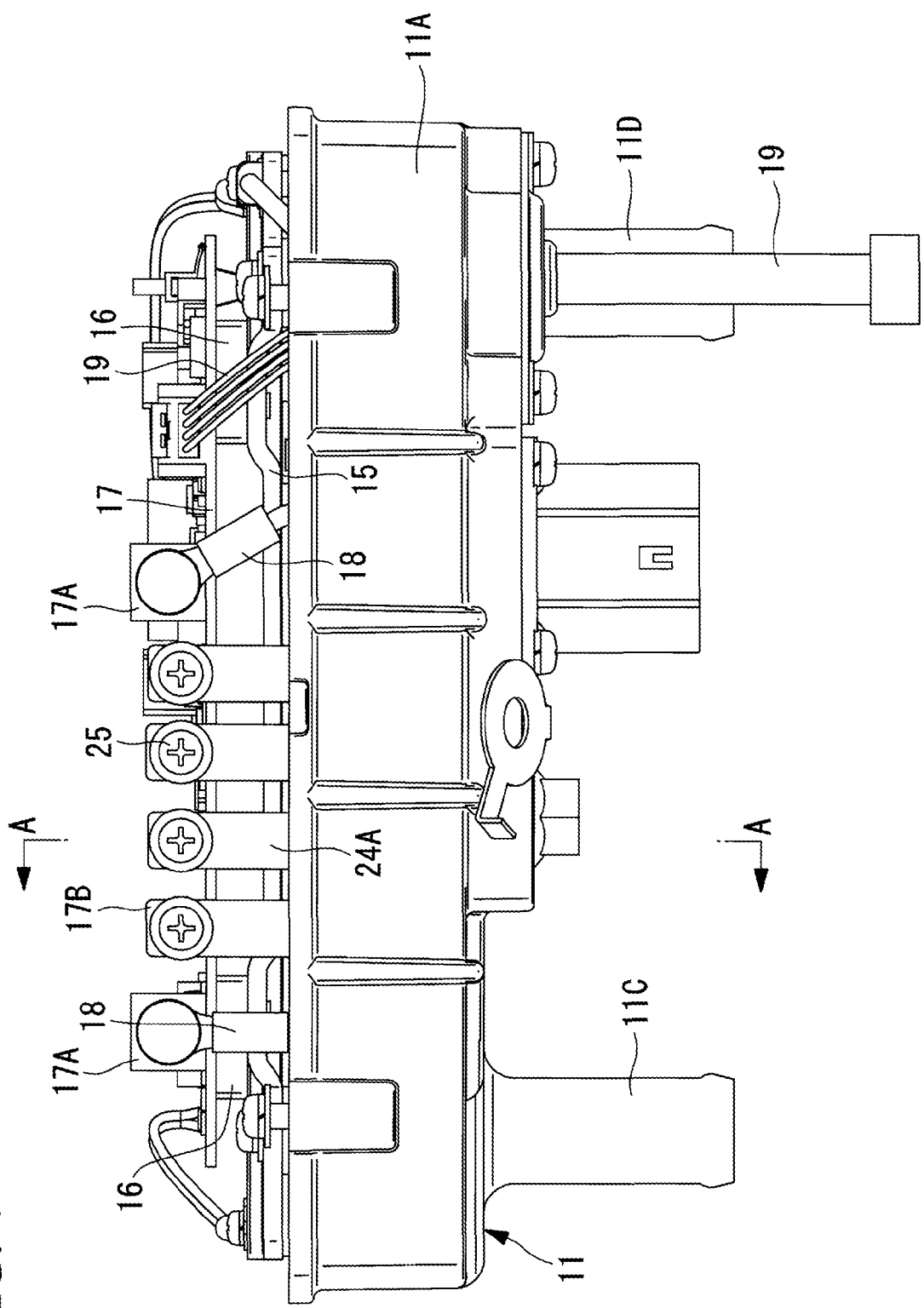
FIG. 4 is a side-view of the heat medium heating unit shown in FIG. 3 and seen from the bottom side thereof.
Figure 5:
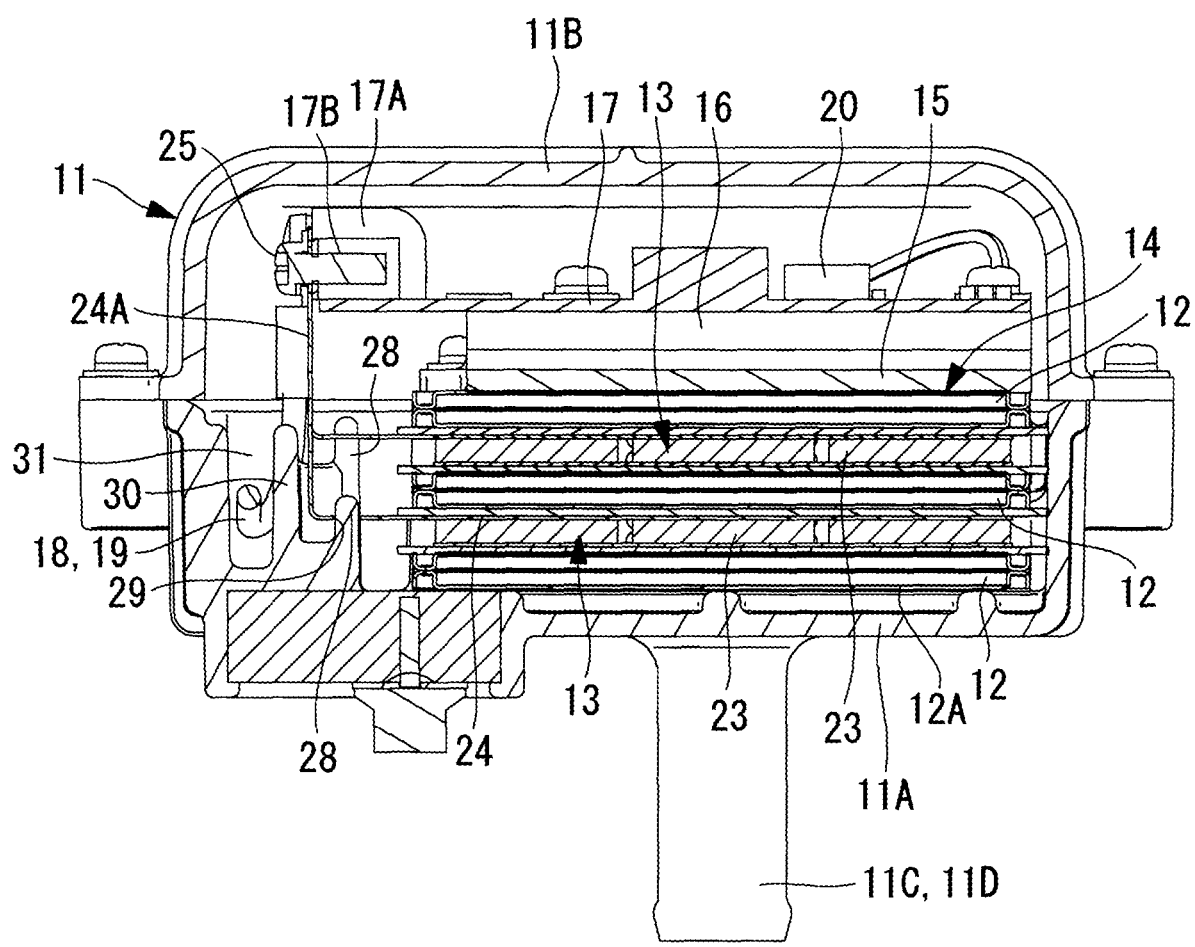
FIG. 5 is a diagram corresponding to a cross-section taken along line A-A in FIG. 4.

FIG. 2 is an exploded perspective view of the heat medium heating unit 10 shown in FIG. 1. FIG. 3 is a plan view of the heat medium heating unit 10 with its upper case removed. FIG. 4 is a side-view of FIG. 3 and seen from the lower side thereof. FIG. 5 is a diagram corresponding to a cross-section taken along A-A.

The heat medium heating unit 10 includes a casing 11 of box shape, a heat exchange module 14 in which a plurality of (for example, three) flat heat exchange tubes 12 and a plurality sets of PTC heaters 13 are stacked alternately, a heat exchanger pressing member 15 for fixing the heat exchange module 14 by pressing it on the inner bottom surface of a lower case 11A of the casing 11, and a control board 17 that controls the PTC heaters 13 disposed via a pair of spacers 16 on the heat exchanger pressing member 15.

The casing 11 is configured to be a box-shaped casing divided into an upper half portion and a lower half portion, and the portions are integrated with one another such that an upper case 11B positioned in the upper half portion is screwed to be fixed to the lower case 11A positioned in the lower half portion (see FIG. 5) via a plurality of screws. The heat exchange module 14 including the aforementioned flat heat exchange tube 12 and PTC heaters 13, the heat exchanger pressing member 15, the pair of spacers 16, the control board 17, and the like are housed and installed in the internal space of the casing 11.

On a lower surface of the lower case 11A, a heat medium inlet pathway 11C, which is for guiding a heat medium introduced to the stacked three flat heat exchange tubes 12, and a heat medium outlet pathway 11D, which is for ejecting the heat medium having circulated within the flat heat exchange tube 12, are integrally formed to protrude downwardly, and boss portions 11E for fixing the heat exchanger pressing member 15 is integrally formed at four positions of the lower case 11A so as to protrude upwardly. The lower case 11A is formed by molding a resin material (for example, PPS) whose coefficient of linear thermal expansion is similar to that of an aluminum alloy material that forms a flat heat exchange tube 12 housed and installed in the internal space thereof. It is also desirable to form the upper case 11B by molding the resin material which is the same as the lower case 11A.

Further, on the lower surface of the lower case 11A, a power supply harness hole (not shown in the drawings) and an LV harness hole (not shown in the drawings) through which the tip parts of the power supply harness 18 and the LV harness 19 passes are opened. The power supply harness 18 is for supplying power to the PTC heaters 13 via the control board 17. The tip part of the power supply harness 18 is branched to have two portions and is configured to be fixed by screws to terminal supports 17A for the two power supply harnesses provided on the control board 17. Further, the LV harness 19 is for transmitting a control signal to the control board 17. A tip part of the LV harness 19 is configured to be connected to the control board 17 as connector connection.

The control board 17 controls applying electricity to the plurality sets of PTC heaters 13 in accordance with an instruction from a superordinate control unit (Electric Control Unit). On the surface of the control board 17, a control circuit 21 that includes a plurality of power transistors (thermogenic electric component) 20 including FETs or IGBTs or the like is installed, and the state of applying electricity to the plurality sets of PTC heaters 13 can be switched via the control circuit 21. The control board 17 includes a heat penetration portion (not shown in the drawings) formed of a highly thermal conductive material such as copper and aluminum so as to lead to both surfaces of the substrate corresponding to a position on which at least a plurality of power transistors 20, which are thermogenic electric components, are installed.

The heat exchange module 14 is constructed such that the plurality of flat heat exchange tubes 12 are stacked so as to sandwich the aforementioned plurality pairs of PTC heaters 13 from both of the faces of the heaters 13. The flat heat exchange tube 12 is configured to superimpose a pair of tubular members made of a thin aluminum-alloy plate formed by press molding. As shown in FIG. 2 and FIG. 5, one set of heat exchange module 14 is formed by stacking, for example, three flat heat exchange tubes 12 to be mutually parallel, and stacking them, sandwiching PTC heaters 13 between adjoining two flat heat exchange tubes 12.

Each flat heat exchange tube 12 includes a flat tube portion 12A configured by overlaying a pair of tubular members with each other in the manner described above, and having a flat cross-sectional shape with the thickness of a few millimeters, an inlet header portion 12B, through which the heat medium is taken in, and an outlet header portion, through which the heat medium is discharged, and those header portions are formed on both end parts of the flat heat exchange tube 12. Further, a wave-plate-shaped inner fin (not shown in the drawings) is disposed in the flat tube portion 12A, and a plurality of heat medium flow passages are formed within the flat tube portion 12A.

Three flat heat exchange tubes 12 are sequentially stacked in the order of the lower-level, the mid-level, and the upper-level, and the inlet header portion 12B and the outlet header portion 12C on both ends of the tubes 12 are brought into contact with one another with sealing members, such as, O rings, a communication hole not shown in the drawings is provided on each of the inlet header portions 12B and the outlet header portions 12C so as to communicate with one another. The three flat heat exchange tubes 12 are assembled in the lower surface in the lower case 11A in the state of having been stacked or sequentially being stacked, and the tubes 12 are pressed and fixed onto the lower surface of the lower case 11A via the heat exchanger pressing member 15, which is fixed to the boss portion 11E (four positions) of the lower case 11A as stated below.

Further, each set of heat exchange module 14 is configured such that one set of PTC heaters 13 are sandwiched between adjacent two of the three flat heat exchange tubes 12 described above. The plurality sets (two sets) of PTC heaters 13 is configured such that electrode plates 24 are placed on both of the upper and lower surfaces of the Positive Temperature Coefficient (PTC) element 23 as publicly known. Each of the PTC heaters 13 is disposed between the adjacent two of the three flat heat exchange tubes 12 via an insulation sheet or the like. The PTC heaters 13 are assembled on the inner bottom surface of the lower case 11A in the state of having been stacked together with the three flat heat exchange tubes 12 or sequentially being stacked, and the heaters 13 are pressed and fixed on the lower surface of the lower case 11A via the heat exchanger pressing member 15 as described.

The electrode plates 24 are for supplying power to the PTC element 23, and formed of an aluminum alloy plate material having a rectangular shape in a plan view. The electrode plates 24 are placed on each surface of PTC element 23. One electrode plate 24 is stacked on the upper surface of the PTC element 23, and the other is stacked on the lower surface of the PTC element 23. These two electrode plates 24 sandwich the PTC element 23 from the upper side and the lower side.

The upper surface of the electrode plate 24 disposed on the upper surface of the PTC element 23 is disposed to be in contact with the lower surface of the flat heat exchange tube 12, and the electrode plate 24 disposed on the lower surface of the PTC element 23 is configured such that the lower surface thereof comes into contact with the upper surface of the flat heat exchange tube 12. In the present embodiment, two electrode plates 24 are provided between the flat heat exchange tube 12 of the lower-level and the flat heat exchange tube 12 of the mid-level, and two electrode plates 24 are provided between the flat heat exchange tube 12 of the mid-level and the flat heat exchange tube 12 of the upper-level. Therefore, four electrode plates 24 are disposed in total.

The four electrode plates 24 have substantially the same shape as the flat tube portion 12A of each flat heat exchange tube 12 and one terminal 24A is provided on the longitudinal edge portion of each electrode plate 24 integrally. The terminals 24A are disposed along the longitudinal edge portions of the electrode plates 24 so as not to overlap on each other when the electrode plates 24 are stacked. The placement of the terminals 24A on the electrode plates 24 are displaced from one another along the longitudinal edge portions thereof. That is, the terminals 24A are arrayed in series when the electrode plates 24 are stacked on each other. Each of the terminals 24A protrudes in the horizontal direction from the electrode plates 24, and has an L-shape extending further upward and configured to be connected to the plurality of (four sets) of the terminal supports 17B arranged in a line with one another on one edge portion of the front surface of the control board 17 by the screws 25.

The three flat heat exchange tubes 12 and two sets of PTC heaters 13 are assembled on the inner bottom surface of the lower case 11A in the state of having been stacked in the manner as described above or being sequentially stacked on each other. The upper surface of the flat heat exchange tube 12 of the uppermost level is pressed toward the inner bottom surface of the lower case 11A via the heat exchanger pressing member 15 fixed to the boss portion 11E (four positions) of the lower case 11A by four screws 26. As a result, the upper and lower surfaces of the inlet header portion 12B and the outlet header portion 12C of the each flat heat exchange tube 12, and the upper and lower surfaces of the flat tube portion 12A of each flat heat exchange tube 12 and surfaces abutting thereto of the PTC heaters 13 are brought into close contact with one another.

With this configuration, the heat exchange module 14 is assembled inside the casing 11, and a heat medium introduced from the heat medium inlet pathway 11C of the lower case 11A is taken from the inlet header portion 12B of each flat heat exchange tube 12 to the inside thereof, and heated by the PTC heaters 13 to undergo temperature rise during circulation in the flat tube portion 12A. After that, the heat medium flows out from each outlet header portion 12C, then passes through the heat medium outlet pathway 11D of the lower case 11A to be ejected to the outside of the heat medium heating unit 10. The heat medium ejected from the heat medium heating unit 10 is delivered to the radiator 6 via the heat medium circulation circuit 10A (see FIG. 1).

The heat exchanger pressing member 15 also serves as a heat sink, which cools a plurality of thermogenic electric components 20 installed on the surface of the control board 17, with the heat penetration portion 22 formed of a highly thermal conductive material, such as copper and aluminum, and the pressing member 15 is composed of a plate material of an aluminum alloy. The heat exchanger pressing member 15 is dimensioned to cover the upper surface of the flat heat exchange tube 12, and has a longitudinal dimension longer than the control board 17. The heat exchanger pressing member 15 is configured to be fixed by screws 26 at a position aligned with the centerline of the boss portion 11E of the casing 11 in order to ensure the sealing capacity around the inlet header portion 12B and the outlet header portion 12C when the heat exchange module 14 including the flat heat exchange tube 12 and PTC heaters 13 are fixed with pressing force.

The pair of spacers 16 are interposed to prevent the intervention between the screws 26 and the control board 17 disposed on the upper surface side of the heat exchanger pressing member 15 when the positions of the screws 26 to fix the heat exchanger pressing member 15 are limited to the positions described above. At least one of the spacers 16 on the position corresponding to the thermogenic electric component 20 installed on the control board 17 is formed of a highly thermal conductive material, for example, a plate member of an aluminum alloy, and can transfer the heat from the thermogenic electric component 20 to the heat exchanger pressing member 15 via the heat penetration portion penetrating the control board 17. Other spacers 16 may be formed of a resin material or other materials.

The control board 17 is configured to be screwed to be fixed by a plurality of screws 27 on the upper surface side of the heat exchanger pressing member 15 via the pair of spacers 16, and disposed so that the heat penetration portion (not shown in the drawings) thereof is placed in contact with the spacer 16 that is formed of a highly thermal conductive material. The terminal support 17A of the control board 17 is connected the power supply harness 18 branched to have two heads. The LV harness 19 is also connected to the terminal support 17A as connector connection. Further, the L-shaped terminals 24A extending from the electrode plates 24 of the PTC heaters 13 are directly connected to the terminal support 17B via screws 25. With this configuration, the control board 17 is assembled on the heat exchanger pressing member 15, and housed within the casing 11 for installation.

Moreover, in order to directly attach the terminals 24A extending from the electrode plates 24 to the terminal support 17B of the control board 17 without using any jig as described above, both members need exact positioning. In order to align the terminal 24A provided on the electrode plates 24 of the PTC heaters 13 stacked together with the plurality of flat heat exchange tubes 12 on the inner bottom surface of the lower case 11A, with the terminal support 17B of the control board 17 installed on the heat exchanger pressing member 15 positioned to be fixed to the boss portion 11E of the lower case 11A, the terminal 24A may be used for the positioning by locating the terminal 24A relative to the lower case 11A when assembled.

Then, in the present embodiment, in order to position four terminals 24A provided in the aforementioned four electrode plates 24 relative to the lower case 11A, four positioning pins (positioning means) 28 are erected in a vertical direction so as to correspond to each of the terminals 24A, the pins are provided in the predetermined position on the inner bottom surface of the lower case 11A as shown in FIG. 5. The four positioning pins 28 are arranged in a line with predetermined intervals. The height of each positioning pin 28 is slightly higher than the horizontally extended portion in which the four terminals 24A are extending in the horizontal direction, and molded integrally with the lower case 11A.

On the other hand, on the horizontally extended portion of each of the four terminals 24A, a positioning hole 29 that can be fitted with the aforementioned positioning pin 28 is provided. Each of the terminals 24A and the electrode plates 24 is positioned relative to the lower case 11A by fitting the positioning holes 29 to each positioning pin 28, and the terminals 24A and the plates 24 are further positioned relative to the terminal support 17B of the control board 17 installed on the heat exchanger pressing member 15 which is positioned and fixed on the boss portion 11E of the lower case 11A.

Further, on a position which is in an external surface side of each of the terminals 24A and adjoining the aforementioned pin array of the positioning pins 28, an insulation wall 30 erected upwardly along each of the terminals 24A extended upwardly are molded integrally with the lower case 11A. The insulation wall 30 defines a wiring space 31 between the side face thereof in the side opposite to each of the terminals 24A and the external wall surface of the lower case 11A to pass the power supply harness 18 and the LV harness 19 connected to the control board 17, so that a predetermined insulation distance can be ensured for each of the terminals 24A and the electrode plates 24.

The plurality of thermogenic electric components 20 including the power transistors or other elements installed on the surface of the control board 17 are disposed on the side close to the heat medium inlet pathway 11C provided in the lower case 11A, that is, disposed on the side close to the inlet header portions 12B of the plurality of flat heat exchange tubes 12 which constitutes the heat exchange module 14 in the state of having been housed and installed in the casing 11. The heat penetration portion penetrating the control board 17 to both surfaces thereof is cooled with the heat exchanger pressing member 15 cooled by the heat medium before heating, which has a comparatively low temperature and is to flow into the inlet header portion 12B, and the pressing member 15 is cooled by the spacer 16 formed of a highly thermal conductive material.

Further, in the aforementioned heat medium heating unit 10, while both faces of the PTC heaters 13 are sandwiched by insulation sheets (not shown) on both surfaces thereof, three flat heat exchange tubes 12 and the two sets of PTC heaters 13 are stacked one by one and assembled on the inner bottom surface of the lower case 11A of the casing 11. When, at the stage where the heat exchange module 14 is assembled, the upper surface thereof is pressed by the heat exchanger pressing member 15 fixed on the lower case 11A, or after the heat exchange module 14 is sub-assembled, the heat exchange module 14 is installed within the lower case 11A, and the upper surface thereof is pressed by the heat exchanger pressing member 15 fixed on the lower case 11A. In either way, each of the flat heat exchange tubes 12 and each of the PTC heaters 13 can be assembled while being in close contact with one another.

Further, the heat medium heating unit 10 can be assembled with the processes of fixing with screws the control board 17 with the spacer 16 being interposed on the heat exchanger pressing member 15, connecting the electrical wiring of the control board 17, and fixing with screws the upper case 11B that covers the upside of the control board 17 to the lower case 11A. The heat medium heating unit 10 circulates the heat medium having entered from the inlet header portion 12B after having passed the heat medium inlet pathway 11C in the plurality of flat heat exchange tubes 12, heats it with the PTC heaters 13, and then causes the heat medium to flow out from the outlet header portion 12C via the heat medium outlet pathway 11D, so that the heat medium heating unit 10 is used for heating the heat medium circulated within the heat medium circulation circuit 10A.

Hence, the heat medium heating unit 10 and the vehicle air conditioning apparatus 1 of the present embodiment provides the following functions and effects.

The configurations of the above embodiments are such that the plurality of flat heat exchange tubes 12 are stacked. In the state where the PTC heaters 13 are sandwiched between the flat tube portions 12A of the flat heat exchange tubes 12, each flat heat exchange tube 12 and the PTC heaters 13 are pressed to be fixed on the lower case 11A by the heat exchanger pressing member 15. Therefore, it is possible to assemble the plurality of flat heat exchange tubes 12 and the plurality of pairs of PTC heaters 13 in close contact with one another.

Accordingly, the thermal contact resistance between the flat heat exchange tube 12 and the PTC heaters 13 are reduced to improve the heat transfer efficiency, achieving improved performance of the heat medium heating unit 10, as well as reducing the planar dimension by stacking the flat heat exchange tube 12 and the PTC heaters 13 in multiple layers, to achieve downsizing the heat exchange module 14, and ultimately those of the heat medium heating unit 10.

Further, the control board 17 that controls the PTC heaters 13 are installed on the heat exchanger pressing member 15, and the terminal 24A extended upwardly from the pair of electrode plates 24 of the PTC heaters 13 are directly connected to the terminal support 17B of the control board 17. This electrically connects the PTC heaters 13 and the control board 17, and provides positioning pins (positioning means) 28, which are for positioning the terminal 24A and the electrode plates 24 by having contact thereto, on the inner bottom surface of casing 11(lower case 11A).

Therefore, upon directly connecting the terminal 24A extended upwardly from the pair of electrode plates 24, to the terminal support 17B of the control board 17, the positioning pin 28 provided on the inner bottom surface of the lower case 11A and the positioning hole 29 provided on the terminal 24A are fitted to each other to position the terminal 24A and the electrode plates 24, so that the terminal 24A of the electrode plates 24 and the terminal support 17B of the control board 17 can be connected in an aligned manner. Therefore, it becomes possible to achieve easy and simple electric connection between the flat heat exchange tube 12 and the PTC heaters 13 and ensure the insulation distance between electrodes and improve workability in assemblage, as well as reduce the number of parts by reducing the necessity of harnesses. This enables simplification of the overall configuration, and cost reduction.

Further, the aforementioned terminals 24A are provided on one side of the plurality of electrode plates 24, to be extended upwardly in an L-shape manner, while being arranged in the direction of the one side, so as to be directly connected to the plurality of terminal support 17B arranged in parallel with one another on one side of the control board 17. By positioning the L-shaped terminals 24A provided on the one side of the plurality of electrode plates of the PTC heaters 13 assembled between the flat tube portion 12A of the flat heat exchange tube 12 at respective predetermined positions via the positioning pins 28, the upper extension portion of each of the terminal 24A is positioned to be opposed to the plurality of terminal supports 17B disposed in parallel with one another on the one side of the control board 17, in order to allow direct connection via the screws 25. Accordingly, the electric connection between the PTC heaters 13 and the control board 17 is made easy and simple, and it is possible to improve the workability of assemblage and achieve cost reduction.

Therefore, according to the present embodiment, the positioning hole 29 of the terminal 24A is provided in the horizontally extending portion of the L-shaped terminal 24A, and can be fitted from above to the positioning pin 28 erected, in a vertical direction, on the inner bottom surface of the lower case 11A. Therefore, by fitting the positioning hole 29 provided in the horizontally extending portion of the terminal 24A from above for assemblage with the positioning pin 28 which is verticality erected, it is possible to easily position the L-shaped terminal 24A relative to the terminal support 17B of the control board 17. Therefore, it is possible to achieve easy and simple electric connection between the PTC heaters 13 and the control board 17, contributing to achieve easier assemblage.

In addition, in the present embodiment, at a position on the external surface side of the terminal 24A adjoining the positioning pin 28 on the inner bottom surface of the lower case 11A, an insulation wall 30 erected upwardly is provided, and at the opposite side of the insulation wall 30 seeing from the terminal 24A is a wiring space 31 which houses the power supply harness 18 and the LV harness 19 which are connected to the control board 17. Therefore, it is possible to reliably ensure a predetermined insulation distance via the insulation wall 30 between the terminal 24A of the electrode plates 24 disposed on the one side of the insulation wall 30, and the power supply harness 18 and the LV harness 19 disposed on the opposite side thereof. With this configuration, it is possible to enhance the insulation properties of the electrical wiring including the control board 17 and the PTC heaters 13 and increase the reliability thereof.

Further, the aforementioned insulation wall 30 is integrally formed with the inner bottom surface of the lower case 11A, and forms a wiring space 31 between it and the external peripheral wall of the lower case 11A. In this way, by forming the insulation wall 30 along the terminal 24A, it is possible to ensure the wiring space 31 at the external surface side of the terminal 24 extend upwardly from the electrode plate 24, which is isolated from the surrounding elements, and dispose the power supply harness 18 and the LV harness 19 connected to the control board 17. Therefore, it is possible to achieve enhanced insulation properties of the control board 17 and the PTC heaters 13 with a simple configuration in which the insulation wall 30 is merely integrally formed on the lower case 11A and increase the reliability thereof.

Further, as stated above, since it is possible to deliver the heat medium heated in the heat medium heating unit 10 whose configuration is simple and which has a small size with an improved performance to the radiator 6 disposed in the air stream passage 2, the air-conditioning performance of the vehicle air conditioning apparatus 1, in particular, the heating performance of the apparatus can be improved, while achieving superior mountability of the air conditioning apparatus on the vehicle.

In the present embodiment, since the heat exchanger pressing member 15 and the spacer 16 are formed of a plate material of an aluminum alloy, the heat from the thermogenic electric component 20 on the control board 17 can be transferred to the heat exchanger pressing member 15 of an aluminum alloy plate material, which has excellent thermal conductivity and is lightweight, through the heat penetration portion of the substrate to radiate the heat to the heat exchanger pressing member 15 whose cooling source is the flat heat exchange tube 12. Thus the thermogenic electric component 20 can be cooled. Accordingly, with the heat exchanger pressing member 15 serving as a heat sink, it is possible to enhance the cooling capability for the thermogenic electric component 20 installed on the surface of the control board 17, and increase the device reliability against heat, while maintaining a reduced weight.

In particular, on the control board 17, the thermogenic electric component 20 is disposed at a position which corresponds to the inlet header portion 12B of the flat heat exchange tube 12 that is the side from which the heat medium flows into the heat medium heating unit 10, to be cooled by the heat medium before heating of a comparatively low temperature, with the heat exchanger pressing member 15 and spacer 16 of highly thermal conductive material serving as heat sinks, so that the thermogenic electric component 20 is efficiently cooled and the cooling capability can be increased.

The present invention is not limited to the aforementioned embodiment, and may be appropriately modified without departure from the scope of the invention. For example, in the aforementioned embodiment, three layers of the flat heat exchange tubes 12 are stacked and the PTC heaters 13 are assembled between the layers. However, the present invention is not limited to this configuration, and of course, the number of flat heat exchange tubes 12 and the PTC heaters 13 to be stacked may be increased or decreased. Further, in the aforementioned embodiment, the casing 11 is formed of a resin material. However, the material of the casing is not limited to resin. The casing 11 may be formed of a metal. For example, it may be formed by aluminum die casting. This is also covered by the scope of the present invention.

REFERENCE SIGNS LIST 1 vehicle air conditioning apparatus
6 radiator
10 heat medium heating unit
10A heat medium circulation circuit
11 casing
11A lower case
12 flat heat exchange tube
12A flat tube portion
12B inlet header portion
12C outlet header portion
13 PTC heater
15 heat exchanger pressing member
17 control board
17B terminal support
18 power supply harness
19 LV harness
24 electrode plates
24A terminal
28 positioning pin (positioning means)
29 positioning hole
30 insulation wall
31 wiring space

The invention claimed is:
1. A heat medium heating unit comprising:
a plurality of flat heat exchange tubes each having a flat tube portion which takes a heat medium via an inlet header portion and which discharges the heat medium after having flowed through the flat tube portion via an outlet header portion;
a PTC heater interposed between the flat tube portions of the plurality of flat heat exchange tubes which are stacked on one another;
a heat exchanger pressing member for pressing the plurality of flat heat exchange tubes and the PTC heater from one side of the flat heat exchange tube toward an inner surface of a casing so that the plurality of flat heat exchange tubes and the PTC heater come into close contact with one another; and
a control board installed on the heat exchanger pressing member, for controlling the PTC heaters, wherein
a terminal extended from each of a pair of electrode plates of the PTC heater is directly connected to one or more terminal supports provided in the control board so that the PTC heater and the control board are electrically connected, and a positioning section which engages with the terminals to position the terminals and the electrode plates is provided on the inner surface of the casing.

2. The heat medium heating unit according to claim 1,
wherein the positioning section is a positioning pin integrally formed with the inner surface of the casing, and the terminals and the electrode plates are configured so that they can be positioned by fitting the positioning pin with a positioning hole provided on the terminal.

3. The heat medium heating unit according to claim 1, wherein
each of the terminals are provided at one side of each of the electrode plates so that the terminals are spaced from each other along the one side, the terminals are shaped in a L-shape one end of which extends upward, and the terminals are configured so as to be directly connected to the terminal supports arranged at intervals on one side of the control board.

4. The heat medium heating unit according to claim 2, wherein
each of the terminals are provided at one side of each of the electrode plates so that the terminals are spaced from each other along the one side, the terminals are shaped in a L-shape one end of which extends upward, and the terminals are configured so as to be directly connected to the terminal supports arranged at intervals on one side of the control board.

5. The heat medium heating unit according to claim 4, wherein
the positioning hole is provided on a horizontally extended portion of each terminal and is configured to fit from above with the positioning pin which is provided on the inner surface of the casing and which is erected in a vertical direction.

6. The heat medium heating unit according to claim 1, wherein
an insulation wall erected upwardly is provided on the inner surface of the casing and at an external surface side of the terminal so as to adjoin the positioning section, a wiring space is formed at an opposite side of the terminal with respect to the insulation wall, and the wiring space is for a power supply harness and an LV harness connected to the control board.

7. A heat medium heating unit comprising:
a plurality of flat heat exchange tubes each having a flat tube portion which takes a heat medium via an inlet header portion and which discharges the heat medium after having flowed through the flat tube portion via an outlet header portion;
a PTC heater interposed between the flat tube portions of the plurality of flat heat exchange tubes which are stacked on one another;
a heat exchanger pressing member for pressing the plurality of flat heat exchange tubes and the PTC heater from one side of the flat heat exchange tube toward an inner surface of a casing so that the plurality of flat heat exchange tubes and the PTC heater come into close contact with one another; and
a control board installed on the heat exchanger pressing member, for controlling the PTC heaters,
wherein a terminal extended from each of a pair of electrode plates which are provided on vertically opposite surfaces of the PTC heater is directly connected to one or more terminal supports provided in the control board so that the PTC heater and the control board are electrically connected, wherein an insulation wall erected upwardly is provided on the inner surface of the casing and at an external surface side of the terminal which is extended upwardly from the electrode plates, a wiring space is formed at an opposite side of the terminal with respect to the insulation wall, and the wiring space is for a power supply harness and an LV harness connected to the control board.

8. The heat medium heating unit according to claim 7, wherein
the insulation wall is integrally formed with the inner surface of the casing, and the wiring space is formed between the insulation wall and an external peripheral wall of the casing.

9. A vehicle air conditioning apparatus configured to make a heat medium heated by a heat medium heating unit circulate in a radiator disposed in an air stream path, wherein the heat medium heating unit according to claim 1 is employed as said heat medium heating unit to heat said heat medium.

10. A vehicle air conditioning apparatus configured to make a heat medium heated by a heat medium heating unit circulate in a radiator disposed in an air stream path, wherein the heat medium heating unit according to claim 7 is employed as said heat medium heating unit to heat said heat medium.

* * * * *